(12) United States Patent
Viswambharan et al.

(10) Patent No.: US 12,052,176 B2
(45) Date of Patent: Jul. 30, 2024

(54) POLICY-BASED FAILURE HANDLING FOR EDGE SERVICES

(71) Applicant: Cisco Technology, Inc., San Jose, CA (US)

(72) Inventors: Rajesh Indira Viswambharan, Bangalore (IN); Nagendra Kumar Nainar, Morrisville, NC (US); Akram Sheriff, San Jose, CA (US); Vinay Saini, Bangalore (IN); David J. Zacks, Vancouver (CA); Carlos M. Pignataro, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 197 days.

(21) Appl. No.: 17/495,479

(22) Filed: Oct. 6, 2021

(65) Prior Publication Data

US 2023/0104007 A1 Apr. 6, 2023

(51) Int. Cl.
*H04L 12/24* (2006.01)
*H04L 1/00* (2006.01)
*H04L 47/20* (2022.01)
*H04L 47/32* (2022.01)

(52) U.S. Cl.
CPC ............ *H04L 47/20* (2013.01); *H04L 1/0078* (2013.01); *H04L 47/32* (2013.01)

(58) Field of Classification Search
CPC ........ H04L 1/0078; H04L 47/20; H04L 47/32
See application file for complete search history.

(56) References Cited

U.S. PATENT DOCUMENTS

| | | | |
|---|---|---|---|
| 10,680,913 B1 | 6/2020 | Achi Vasudevan et al. | |
| 11,665,095 B2 * | 5/2023 | Subramanian | H04L 41/0894 |
| | | | 709/223 |
| 2003/0189946 A1 * | 10/2003 | Yajnik | H04L 67/63 |
| | | | 370/428 |
| 2020/0366559 A1 * | 11/2020 | Parvataneni | H04L 43/0852 |
| 2021/0026746 A1 | 1/2021 | Larkin et al. | |
| 2021/0126830 A1 * | 4/2021 | R | H04L 49/555 |
| 2021/0185142 A1 * | 6/2021 | Paduroiu | H04L 65/60 |
| 2021/0243247 A1 * | 8/2021 | He | H04L 67/63 |
| 2022/0137876 A1 * | 5/2022 | Chung | G06F 3/067 |
| | | | 711/154 |
| 2023/0107735 A1 * | 4/2023 | Wang | H04L 67/02 |
| | | | 370/235 |

FOREIGN PATENT DOCUMENTS

WO WO2020253266 A1 12/2020

* cited by examiner

*Primary Examiner* — Phuc H Tran
(74) *Attorney, Agent, or Firm* — Lee & Hayes, P.C.

(57) ABSTRACT

Techniques for policy-based failure handling of data that is received for processing by failed edge services are described herein. The techniques may include receiving, at an edge node of a network, a data handling policy for a service hosted on the edge node. The service may be configured to process traffic on behalf of an application hosted by a cloud-based platform. In some examples, the data handling policy may be stored in a memory that is accessible to the edge node. The techniques may also include receiving traffic at the edge node that is to be processed at least partially by the service. At least partially responsive to detecting an error associated with the service, the edge node may cause the traffic to be handled according to the data handling policy while the service is experiencing the error.

20 Claims, 8 Drawing Sheets

POLICY-BASED FAILURE HANDLING FOR EDGE SERVICES

TECHNICAL FIELD

The present disclosure relates generally to techniques for, among other things, policy-based failure handling that leverages the sensitivity and criticality of the data that is received for processing by different edge services.

BACKGROUND

Today's enterprises generally leverage edge computing to perform required processing of enterprise data before being sent to the cloud. These edge nodes typically run multiple containers and/or microservices for processing different application and/or protocol specific data, and can regularly process critical telemetry of network devices, such as internet-of-things (IOT) sensors and enterprise sensitive data. This filtered, semi-processed data can then be sent to the cloud. In a typical edge environment, however, there can be a possibility of certain services temporarily going down or entering an error state. As a result, the incoming data during this dormant phase can be lost or queued until the service is restored on the edge node. However, many applications are sensitive to data loss, delays in processing, or not in favor of storing sensitive info in the edge node, etc.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
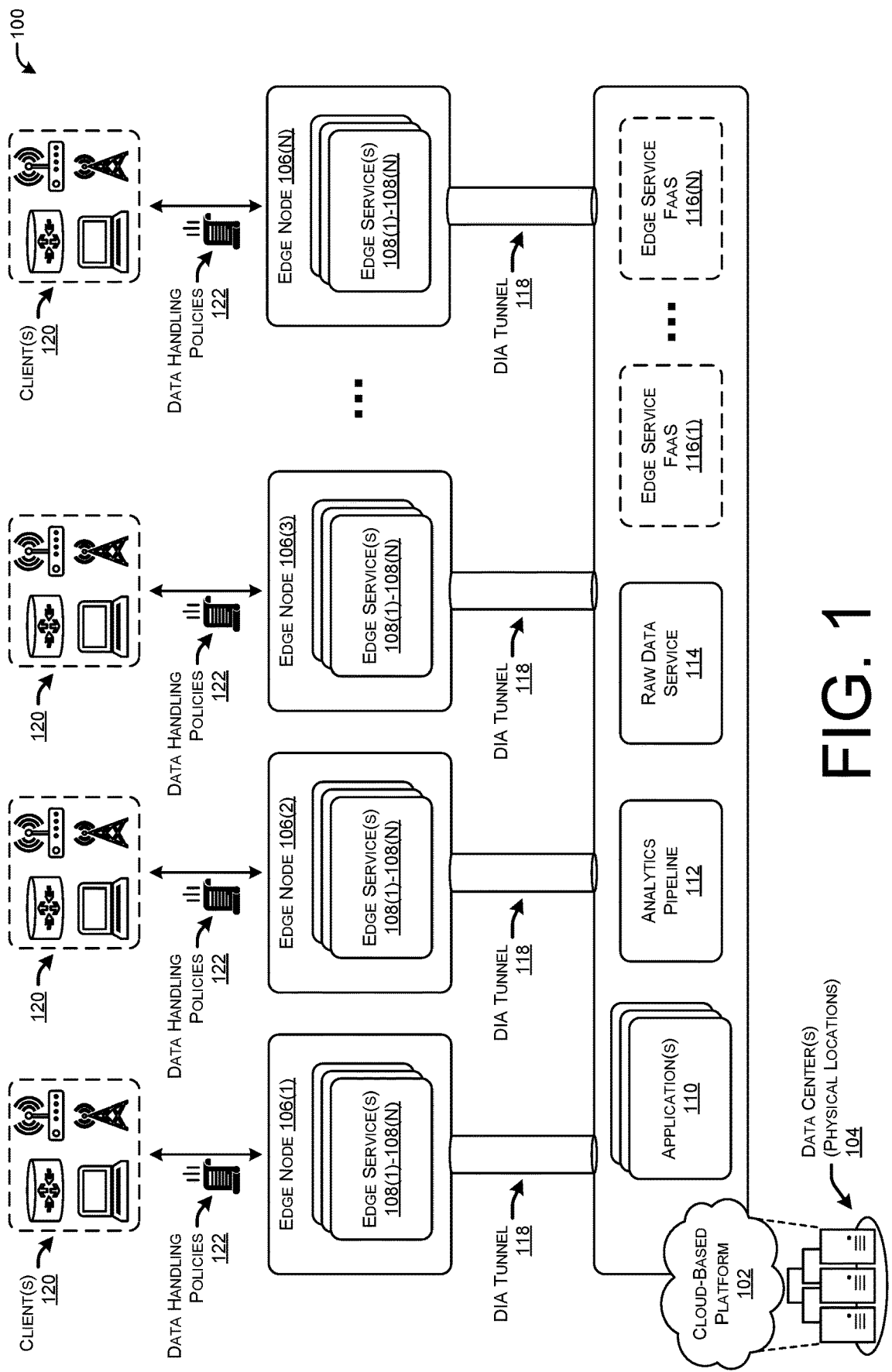
FIG. 1 is a system-architecture diagram illustrating an example architecture in which edge nodes may be used to process data on behalf of one or more applications hosted on a cloud-based platform.

This disclosure describes various technologies associated with policy-based failure handling that leverages the sensitivity and criticality of the data that is received for processing by different edge services. By way of example, and not limitation, a method according to the technologies described herein may include receiving, at an edge node of a network, a data handling policy for a service that is hosted on the edge node, the service configured to process traffic on behalf of an application hosted by a cloud based platform, the data handling policy to be applied in response to detection of errors associated with the service. The data handling policy may be stored in a memory that is accessible to the edge node. The method may also include receiving, at the edge node, traffic that is to be processed at least partially by the service and, at least partially responsive to detecting an error associated with the service, the traffic may be handled according to the data handling policy. For instance, the data handling policy may be to drop the traffic, to store the traffic until the error is resolved, to send the traffic to a companion edge node for processing, or to send the traffic unprocessed to the cloud-based platform.

Additionally, the techniques described herein may be performed as a method and/or by a system having non-transitory computer-readable media storing computer-executable instructions that, when executed by one or more processors, performs the techniques described above.

Example Embodiments

As discussed above, enterprises generally leverage edge computing to perform required processing of enterprise data before being sent to the cloud. However, in a typical edge environment there could be a possibility of certain services temporarily going down or entering an error state. As a result, the incoming data during this dormant phase can be lost or queued until the service is restored on the edge node. However, many applications are sensitive to data loss, delays in processing, or not in favor of storing sensitive info in the edge node, etc.

Accordingly, this disclosure describes various techniques for policy-based failure handling that leverages the sensitivity and criticality of the data that is received for processing by different edge services. For example, some of the applications operating on today's edge nodes can include applications to process device (e.g., IOT device) telemetry before sending to the cloud, applications to process analytics before passing to other destinations, 5G applications, protocol specific handling, and the like. For each of these applications, a failure scenario should be handled appropriately for the underlying applications and/or devices based on the true nature of the application.

In some examples, a given edge node may be running one or more services (e.g., application, device, or protocol specific services and/or containers) to receive and process data on behalf of network clients (e.g., devices, sensors, applications, etc.) before being sent to a cloud-based platform. Additionally, the edge node may have secure mechanisms for the network clients to connect to the appropriate edge service, and the edge node may maintain an inventory of these components. In some instances, the edge node may have direct internet access (DIA) to the cloud through a tunnel that can be used by the edge node to send the processed data in a secured manner. When a network client initially connects to the edge node, the network client may negotiate a data handling policy (e.g., telemetry handling policy) with the edge node. The data handling policy can contain instructions to handle the client's data when the respective service fails. For instance, data handling policy options may include one or more of dropping the packet (e.g., may be used by clients that may not be sensitive to sporadic data loss), storing the packet locally on the edge node or the client itself as negotiated and then processing the data once the respective service comes up, invoking a companion edge node and/or application to process the data and route it to the cloud (e.g., may be used for delay sensitive applications), and/or sending the raw data to a raw cloud pipeline to be processed with a purpose-built function-as-a-service (FaaS) (e.g., may be used by ultra-delay sensitive applications).

In some examples, the edge nodes may include extended Berkeley Packet Filter (eBPF) programs (e.g., attached with networking stack) to catch connection failures and/or error state scenarios of services and update respective state entries in the eBPF Maps. Additionally, in some instances, an eBPF program may be configured to "snoop" into return traffic and capture error states. Furthermore, a monitoring application (e.g., referred to herein as a "Remedial Service") in the user space of the edge node may be configured to monitor the eBPF Map and, based on detecting a service error state change in the eBPF Map, the Remedial Service may trigger the subsequent operation negotiated in the data handling policy.

In some examples, the Remedial Service and the eBPF program (e.g., the networking stack in the Kernel space of the edge node) may share responsibilities to handle different failure policies for optimization purposes. For instance, the data handling policy instructions may be added in the eBPF map also by the Remedial Service, which may help the eBPF program to honor the decisions at the Kernel level for the required policies.

In some examples where the underlying device/client is not sending time sensitive data, then dropping the packet may be the data handling policy that is preferred by the device/client. For instance, the network error may be sent back to the device/client whereas the edge may not have any interim data storage if there is a service failure. In some instances, when this policy is set for an application or device, if there is any failure detected in the respective service, the status may be updated accordingly in the eBPF map and the subsequent data coming from the device will be dropped directly at the kernel level rather than propagating it to the user space.

In some examples, a data handling policy to store the data locally may have two sub options: data-stored-on-edge or data-stored-on-device until the service is restored. In some instances, a new type of error message may be used which can either be protocol agnostic or can be on a per application basis. For instance, if the edge stores the data, the error message may be fired from eBPF to the device to indicate that the data is temporarily stored in the edge. In this way, the device can continue to send the data to the edge node and the eBPF may capture and store it until the underlying service is restored. Additionally, or alternatively, the eBPF can punt the data to the remedial service, which can store the data accordingly. If the device stores the data, then after receiving the first error message from the edge (e.g., eBPF message) the device may store the subsequent data in its storage. In some examples, the device may opt for a store-all or a sample-and-store-all kind of approach. In this way, the device can periodically check the sample data to check the status of the service.

In some examples in which the data handling policy is to process the data with a companion edge node, the central intelligence in the cloud may identify potential nearby edge servers (e.g., which can be the closest edge server with secure East-West communication established between them, or any other edge server) that can act as the companion edge in case of the local service failure. If the application is critical and the device policy prefers to process with another edge node before pushing to cloud, this option may be ideal. In some examples, a new East-West service tunnel may be established from a first edge server site to a second edge server site. The service tunnel may be either unidirectional or bidirectional. Upon detecting a local service failure, the raw data may be augmented with additional metadata and forwarded towards the companion edge. In some examples, the choice of metadata may be influenced by the overlay encapsulation used and may not be limited to any specific encapsulation. The companion edge site, upon receiving the raw data, may process the raw data in the local service and upload the analytics to the cloud, tagging the first edge service site.

In some examples, delay sensitive applications may benefit from negotiating with the edge node a failover data handling policy to export the raw data to the cloud. For instance, when an error is encountered, packets may be encapsulated with information, such as which failed service was originally intended to process the data. The data packet may be sent to a raw data service in the cloud. In some examples, the receiving service may take the raw packet and check which service failed in the edge node and invoke the respective service as a FaaS to process the raw data. This may ensure that the edge functionality is obtained through the FaaS function to convert the data into the correct form so that the cloud application may consume it.

As noted above, in various examples, different combinations of different failover data handling policies can also be used for any service. For example, a service may associate to have the action as: drop the data for a first period of time; if the issue persists, sample and store locally for a second period of time; and if, after the second period of time, the issue still persists, send the traffic to a companion edge node. However, other combinations may also be used. In some examples, if the failed service gets any read and/or get requests then the eBPF program may detect those requests and send the error message directly, rather than letting it fail in the dormant service. This solution may also be used with kTLS to deal with kernel-based encryption and/or decryption to look into any encrypted packets to identify the type of request and error state.

In some examples, it may be necessary to track and/or clear states entered in the eBPF Maps so that transient issues of an application that result in error generation are not handled as an error. In at least one example, this can be handled by periodically punting inbound traffic that matches the local entry to the actual application and check if the same error message is generated. Based at least in part on the same, the local entry timer may be extended or may be cleared if the error is no longer generated by the application. Additionally, or alternatively, the eBPF program may use full stack observability capability (e.g., periodically injecting synthetic probes, such as opentracing) or use open telemetry capability to continuously monitor the workload application and clear the state entries as desired.

The techniques described herein can improve the operation of edge nodes in cases where edge services are down. For instance, by invoking a service that is running on a companion edge node to process data in response to a local edge node service going down, critical and time-sensitive applications may be able to more reliably depend on cloud-platform infrastructure for processing data. Additionally, when a service goes down, a data handling policy that is specific to that service, or the data that the service processes, can be invoked rather than treating all service failures the same, which may be undesirable. These and other improvements in computer-related technology will be readily apparent to those having ordinary skill in the art.

By way of example and not limitation, the techniques disclosed herein may include receiving, at an edge node of a network, a data handling policy for a service hosted on the edge node, the data handling policy to be applied in response to detection of errors associated with the service. In some examples, the service may be configured to process traffic on behalf of an application hosted by a cloud-based platform. In some examples, a client device (e.g., an IOT device, a wireless device, 5G RAN, a wired device, etc.) may negotiate the data handling policy with the edge node upon the client device initially connecting with the edge node.

In some examples, the data handling policy may be stored in a memory that is accessible to the edge node. For instance, the data handling policy may be stored in a memory of the edge node, in a data store, a key-value database, or the like. In at least one example, the data handling policy is stored by a remedial service that is running in the user space of the edge node. The techniques may also include receiving, at the edge node, traffic that is to be processed at least partially by the service. For instance, the service may process the traffic at the edge node and then forward the processed traffic to the application on the cloud-based platform.

In some examples, at least partially responsive to detecting an error associated with the service, the traffic may be handled according to the data handling policy. In some examples, the data handling policy may specify that the edge node, in response to detecting an error associated with the service, is to drop the traffic, store the traffic until the error is resolved, send the traffic to a companion edge node for processing, send the traffic unprocessed to the cloud-based platform, and/or the like. In at least one example, the data handling policy is to store the traffic until the error is resolved, and handling the traffic according to the data handling policy may include storing the traffic in at least one of a first memory of the edge node or a second memory of a device that sent the traffic.

In at least one example, the data handling policy is to send the traffic to a companion edge node hosting the service such that the traffic is processed by the service of the companion edge node. For instance, the edge node may receive, from the cloud-based platform, an indication that the traffic is to be sent to the companion edge node at least partially responsive to detecting the error. Based at least in part on the indication, a communication connection may be established between the edge node and the companion edge node. In this way, at least partially responsive to detecting the error, the traffic may be sent to the companion edge node, via the communication connection, for processing by the service.

In some examples, the error associated with the service may be detected by an eBPF program that is executing on the edge node. For instance, the eBPF program is configured to analyze return traffic from the service and update an eBPF map to indicate a state associated with the service. Additionally, in some instances, causing the traffic to be handled according to the data handling policy may be at least partially responsive to detecting, by a monitoring application (e.g., remedial service) executing on the edge node, a state change associated with an eBPF map, the state change indicative of the error associated with the service.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 is a system-architecture diagram illustrating an example architecture 100 in which edge nodes 106(1)-106(N) (e.g., edge servers) (where N represents any number greater than or equal to one) may be used to process data on behalf of one or more applications 110 hosted on a cloud-based platform 102. The cloud-based platform 102 and the edge nodes 106(1)-106(N) may be located within one or more data center(s) 104. The one or more data center(s) 104 may be physical facilities or buildings located across geographic areas that are designated to store computing resources. The data center(s) 104 may include various networking devices, as well as redundant or backup components and infrastructure for power supply, data communication connections, environmental controls, internet-of-things devices, services, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), networking (bandwidth), security, and the like. However, in some examples the devices of the cloud-based platform 102 and/or the edge nodes 106(1)-106(N) may not be located in explicitly defined data centers 104 but may be located in other locations or buildings.

The edge nodes 106(1)-106(N) (hereinafter referred to collectively as "edge nodes 106") may host one or more edge services 108(1)-108(N) (hereinafter referred to collectively as "edge services 108") (where N represents any number greater than or equal to one). The edge services 108 may process data (e.g., traffic packets) before being sent to the cloud-based platform 102. For instance, the edge services 108 of the edge nodes 106 may receive data from the connected clients 120, process the data at least partially, and then send the processed data to the applications 110 hosted on the cloud-based platform. Example edge services 108 may include application specific services, device specific services, and/or protocol specific services. In some examples, the services may be container-based services. The edge nodes 106 may be connected to the cloud-based platform 102 via a secure, direct internet access (DIA) tunnel 118, and the edge nodes 106 may send the processed or unprocessed data to the cloud-based platform 102 via the DIA tunnels 118.

The cloud-based platform 102 may host one or more applications 110, as well as include an analytics pipeline 112, a raw data service 114, and one or more edge services running as a FaaS 116(1)-116(N) (where N represents any number greater than or equal to one). The edge service functions 116 may be ran and/or instantiated on demand, for instance, if one of the edge services 108 goes down or is in an error state. For example, in some scenarios, if an edge service 108 goes down, the raw data received from one of the connected clients 120 may be forwarded to the raw data service 114 of the cloud-based platform 102, and based at least in part on receiving the raw data, the specific edge service 108 that is down may be spun up as a FaaS edge service 116 and ran on the cloud-based platform 102.

When a client 120 initially connects to an edge node 106, the client 120 may negotiate a data handling policy 122 (e.g., failover policy, telemetry handling policy, etc.) with the edge node 106. The data handling policy 122 can contain instructions to handle the client's 120 data when a respective service 108 fails. For instance, data handling policy 122 options may include one or more of dropping packets (e.g., may be used by clients 120 that may not be sensitive to sporadic data loss), storing packets locally on the edge node 106 or the client 120 itself as negotiated, and then processing the data once the respective service 108 comes up, invoking a companion edge node 106(2) and/or service to process the data and route it to the cloud-based platform 102 (e.g., may be used for delay sensitive applications), and/or sending the raw data to a raw cloud pipeline (e.g., raw data service 114) to be processed with a purpose-built edge service FaaS 116 (e.g., may be used by ultra-delay sensitive applications).

In some examples where the client 120 is not sending time sensitive data, then dropping the packet may be the data handling policy 122 that is preferred by the client 120. For instance, the network error may be sent back to the client 120 whereas the edge 106 may not have any interim data storage if there is a service failure. In some instances, when this policy is set for an application or device, if there is any failure detected in the respective service 108, the status may be updated accordingly in an eBPF map on the edge node 106 and the subsequent data coming from the client 120 may be dropped directly at the kernel level rather than propagating it to the user space.

In some examples, a data handling policy 122 to store the data locally may have two sub options: data-stored-on-edge or data-stored-on-device until the service 108 is restored. In some instances, a new type of error message may be used which can either be protocol agnostic or can be on a per application basis. For instance, if the edge 106 stores the data, the error message may be fired from eBPF to the client 120 to indicate that the data is temporarily stored in the edge 106. In this way, the client 120 can continue to send the data to the edge node 106 and the eBPF may capture and store it until the underlying service 108 is restored. Additionally, or alternatively, the eBPF can punt the data to a remedial service hosted on the edge 106, which can store the data accordingly. If the client 120 stores the data, then after receiving the first error message from the edge 106 (e.g., eBPF message) the client 120 may store the subsequent data in its storage. In some examples, the client 120 may opt for a store-all or a sample-and-store-all kind of approach. In this way, the client 120 can periodically check the sample data to check the status of the service 108.

In some examples in which the data handling policy is to process the data with a companion edge node, central intelligence in the cloud-based platform 102 may identify potential nearby edge servers (e.g., which can be the closest edge server with secure East-West communication established between them, or any other edge server) that can act as the companion edge in case of the local service failure. If the application is critical and the client policy prefers to process with another edge node before pushing to cloud, this option may be ideal. In some examples, a new East-West service tunnel may be established from a first edge server site (e.g., edge node 106(1)) to a second edge server site (e.g., edge node 106(2)). The service tunnel may be either unidirectional or bidirectional. Upon detecting a local service failure on the edge node 106(1), the raw data may be augmented with additional metadata and forwarded towards the companion edge 106(2). In some examples, the choice of metadata may be influenced by the overlay encapsulation used and may not be limited to any specific encapsulation. The companion edge site 106(2), upon receiving the raw data, may process the raw data in the local service and upload the analytics to the cloud-based platform 102, tagging the first edge service site 106(1).

In some examples, delay sensitive applications 110 and/or clients 120 may benefit from negotiating with the edge node 106 a failover data handling policy 122 to export the raw data to the cloud-based platform 102. For instance, when an error is encountered, packets may be encapsulated with information, such as which failed service was originally intended to process the data. The data packet may be sent to a raw data service 114 in the cloud-based platform 102. In some examples, the raw data service 114 may take the raw packet and check which service 108 failed in the edge node 106 and invoke the respective service as a FaaS 116 to process the raw data. This may ensure that the edge functionality is obtained through the FaaS function to convert the data into the correct form so that the cloud application 110 may consume it.

Figure 2:
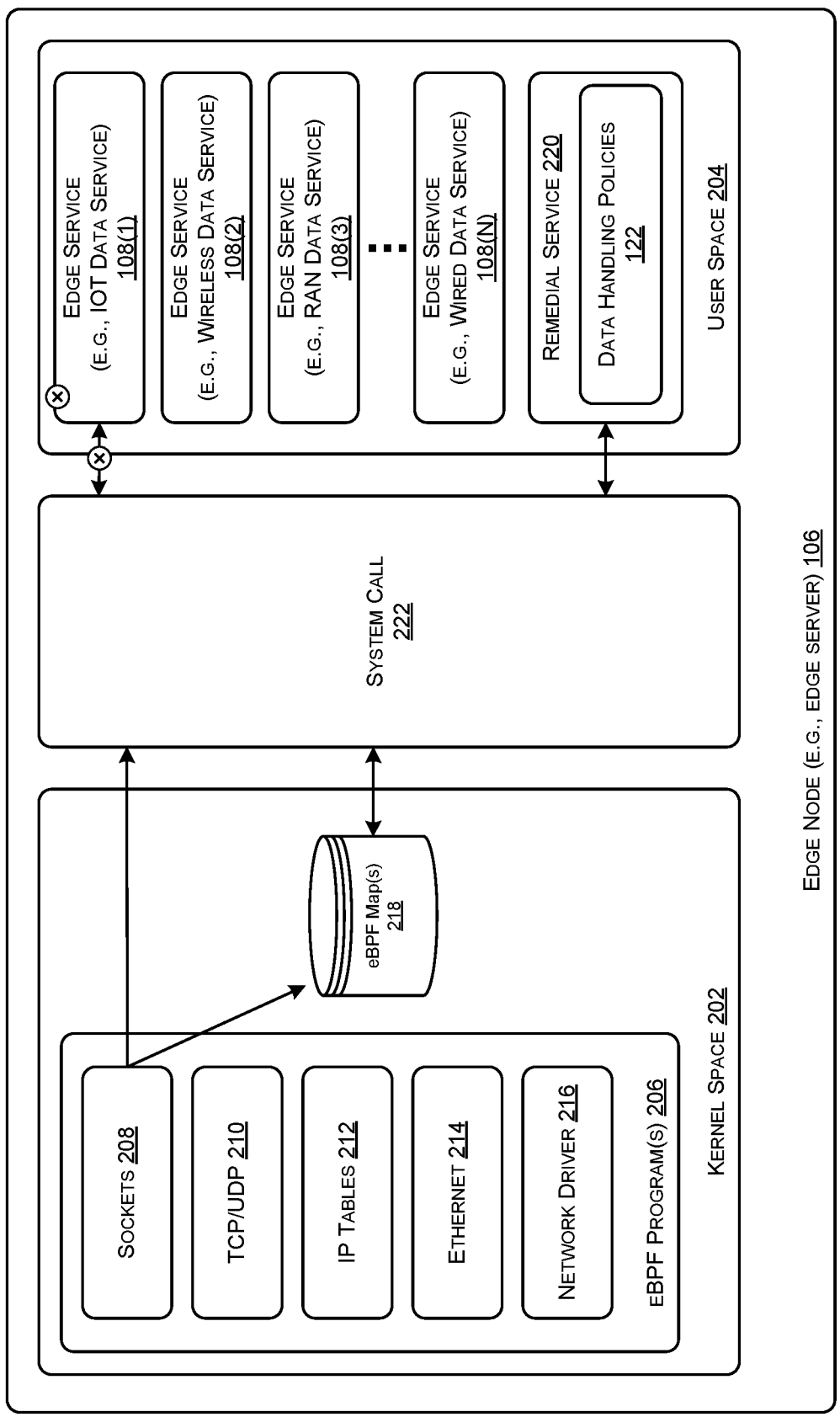
FIG. 2 is a block diagram illustrating example detail of an edge node that may be used to perform the techniques described herein.

FIG. 2 is a block diagram illustrating example detail of an edge node 106 that may be used to perform the techniques described herein. The edge node 106 may include a kernel space 202 and a user space 204. The kernel space 202 may run/host one or more extended Berkeley Packet Filter (eBPF) programs 206 and one or more eBPF Map(s) 218. The eBPF programs 206 may include a sockets component 208, a TCP/UDP component 210, IP tables 212, an ethernet component 214, and a network driver 216. The one or more eBPF programs 206 may catch connection failures and/or error state scenarios of edge services 108 and update respective state entries in the eBPF Map(s) 218. Additionally, in some instances, an eBPF program 206 may be configured to "snoop" into return traffic and capture error states.

The user space 204 may host one or more edge services 108(1)-108(N), such as an IOT data service, a wireless data service, a RAN data service, a wired data service, and the like. A remedial service 220 may also be running in the user space 204. The remedial service may store the data handling policies 122. The remedial service 220 may be a monitoring application that is configured to monitor the eBPF Map(s) 218 and, based on detecting a service error state change in the eBPF Map(s) 218, the remedial service 220 may trigger subsequent operations as defined in the data handling policies 122. In some examples, the remedial service 220 and the eBPF program 206 may share responsibilities to handle different failure policies for optimization purposes. For instance, the data handling policy 122 instructions may be added in the eBPF map 218 by the remedial service 220, which may help the eBPF program 206 to honor the decisions at the Kernel level for the required policies. The kernel space 202 and the user space 204 may communicate data back and forth using a system call 222.

Figure 3:
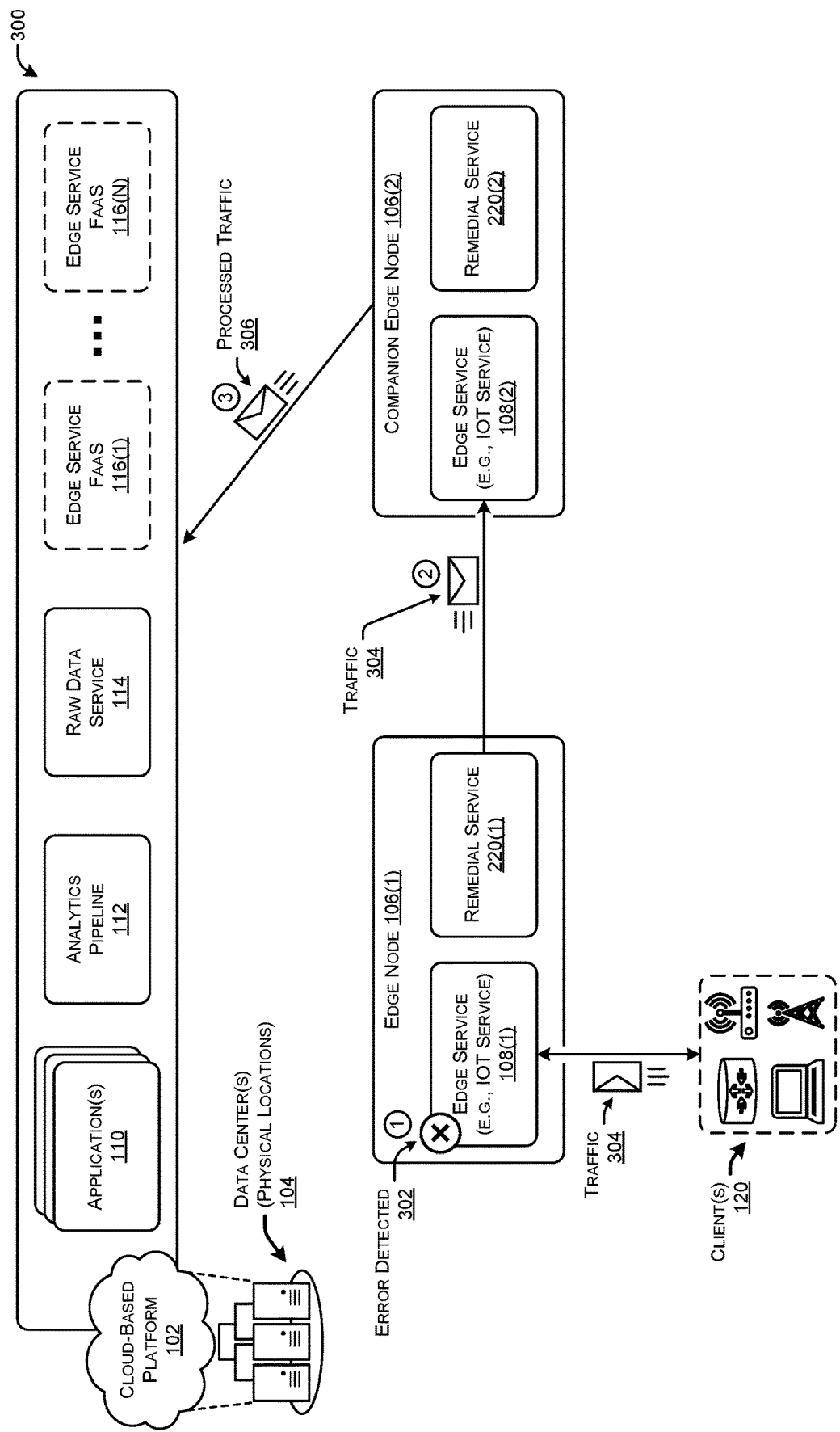
FIG. 3 is a data flow diagram illustrating an example process in which an edge node uses a companion edge node to process data in response to detecting an error.

FIG. 3 is a data flow diagram illustrating an example process 300 in which an edge node 106(1) uses a companion edge node 106(2) to process data in response to detecting an error. In at least one example when a data handling policy is negotiated for the edge node 106(1) to use the companion edge node 106(2) to process the data, central intelligence in the cloud-based platform 102 may identify the companion edge node 106(2) as a potential nearby edge server (e.g., which can be the closest edge server with secure East-West communication established between them, or any other edge server) that can act as the companion edge in case of the local service failure. In some examples, a new East-West service tunnel may be established from the edge node 106(1) site to the companion edge node 106(2) site. The service tunnel may be either unidirectional or bidirectional.

At "1," the edge node 106(1) may detect an error 302 associated with the edge service 108(1). For instance, an eBPF program running on the edge node 106(1) may detect the error and update respective state entries in the eBPF Maps. The remedial service 220(1) in the user space of the edge node 106(1) may monitor the eBPF Map and, based on detecting a state change in the eBPF Map, the remedial service 220(1) may trigger the subsequent operation negotiated in the data handling policy, in this case, to forward the traffic 304 to the companion edge node 106(2).

At "2," the traffic 304 (e.g., the unprocessed traffic) is forwarded from the edge node 106(1) to the companion edge node 106(2) based at least in part on the data handling policy negotiated by the client 120 that sent the traffic 304. In some examples, the traffic 304 is forwarded from the edge node 106(1) to the companion edge node 106(2) via the East-West service tunnel that was established. In some examples, the raw data of the traffic 304 may be augmented with additional metadata before being forwarded to the companion edge node 106(2). In some instances, the choice of metadata may be influenced by the overlay encapsulation used on the traffic 304, and may not be limited to any specific encapsulation. Upon receiving the traffic 304 at the companion edge node 106(2), the traffic 304 may be processed using the edge service 108(2) (which may be the same or similar service as the edge service 108(1)) on the companion edge node 106(2). Then, at "3," the processed traffic 306 may be sent to the cloud-based platform. Additionally, in some examples, analytics associated with the traffic may be uploaded to the cloud-based platform 102, tagging the edge node 106(1).

Figure 4:
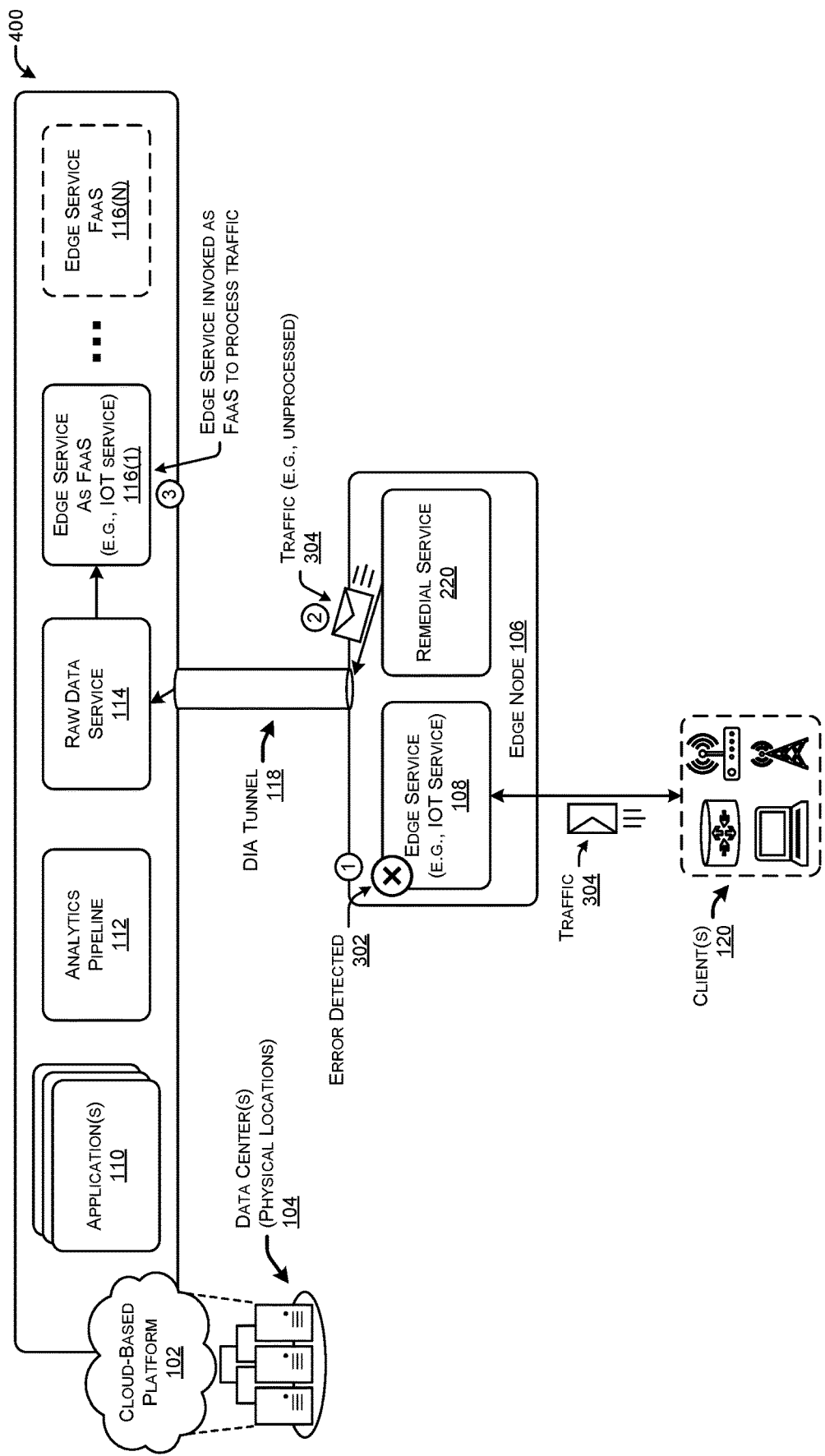
FIG. 4 is a data flow diagram illustrating an example process in which an edge node sends unprocessed traffic to a cloud-based platform in response to detecting an error.

FIG. 4 is a data flow diagram illustrating an example process 400 in which an edge node 106 sends unprocessed traffic 304 to a cloud-based platform 102 in response to detecting an error. This type of data handling policy may be ideal, in some instances, for delay sensitive applications 110 and/or delay-sensitive clients 120. That is, the client 120 may benefit from negotiating with the edge node 106 a failover data handling policy to export the raw data (e.g., unprocessed traffic 304) to the cloud-based platform 102.

At "1," the edge node 106 may detect an error 302 associated with the edge service 108. For instance, an eBPF program running on the edge node 106 may detect the error and update respective state entries in the eBPF Maps. The remedial service 220 in the user space of the edge node 106 may monitor the eBPF Map and, based on detecting a state change in the eBPF Map, the remedial service 220 may trigger the subsequent operation negotiated in the data handling policy, in this case, to forward the unprocessed traffic 304 directly to the cloud-based platform 102 (e.g., to the raw data service 114 of the cloud-based platform 102).

In some instances, when an error is encountered, metadata may be added to the unprocessed traffic 304. For instance, the unprocessed traffic 304 may be encapsulated with information, such as which failed service 108 was originally intended to process the traffic 304. At "2," the traffic 304 may be sent to the raw data service 114 in the cloud-based platform 102 via the secure DIA tunnel 118. At "3," the raw data service 114 may take the unprocessed traffic 304 and check which service 108 failed in the edge node 106 and invoke the respective service as a FaaS 116(1) to process the raw data. This may ensure that the edge functionality is obtained through the FaaS function to convert the data into the correct form so that the cloud application 110 may consume it.

Figure 5:
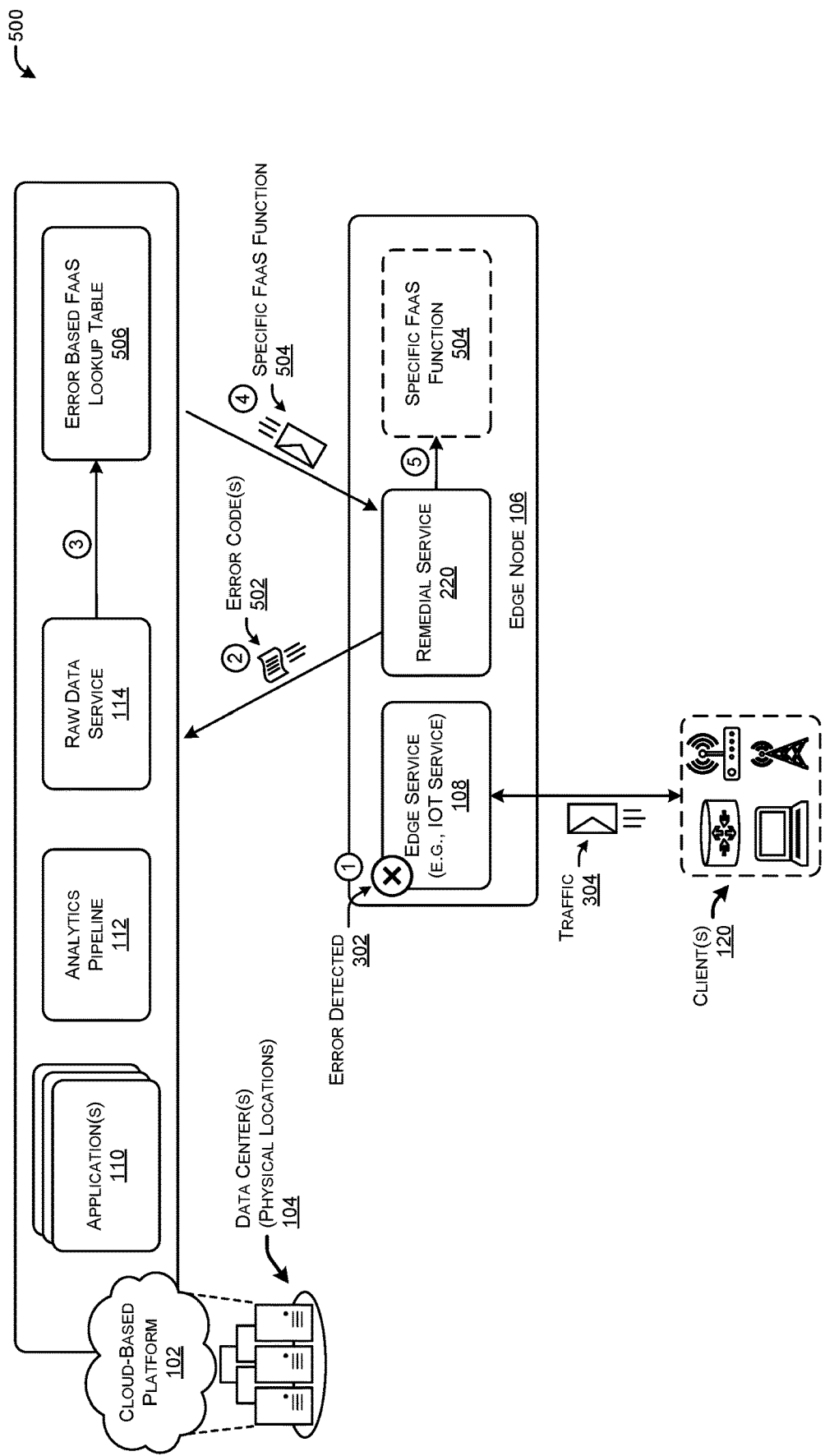
FIG. 5 is a data flow diagram illustrating an example process in which a specific FaaS function is instantiated on an edge node in response to an error.

FIG. 5 is a data flow diagram illustrating an example process 500 in which a specific FaaS function 504 is instantiated on an edge node 106 in response to an error. This type of data handling policy may be ideal, in some instances, for delay sensitive applications 110 and/or delay-sensitive clients 120. That is, the client 120 may benefit from negotiating with the edge node 106 a failover data handling policy to instantiate the specific FaaS function 504 on the edge node 106 in response to detecting errors.

At "1," the edge node 106 may detect an error 302 associated with the edge service 108. For instance, an eBPF program running on the edge node 106 may detect the error and update respective state entries in the eBPF Maps. The remedial service 220 in the user space of the edge node 106 may monitor the eBPF Map and, based on detecting a state change in the eBPF Map, the remedial service 220 may trigger the subsequent operation negotiated in the data handling policy, in this case, to send one or more error codes 502 associated with the error to the cloud-based platform such that the specific FaaS function 504 may be instantiated on the edge node 106.

At "2," the remedial service 220 sends the one or more error codes 502 to the cloud-based platform 102. In response to receiving the one or more error codes 502, at "3," the raw data service 114 may perform a lookup in an error based FaaS lookup table 506 to determine which specific FaaS function should be instantiated in response to the specific error code 502.

At "4," the cloud-based platform 102 sends the specific FaaS function 504 that is to be instantiated on the edge node 106 to the remedial service 220. And, at "5," the remedial service 220 instantiates the specific FaaS function 504 on the edge node 106 to process the traffic 304.

Figure 6:
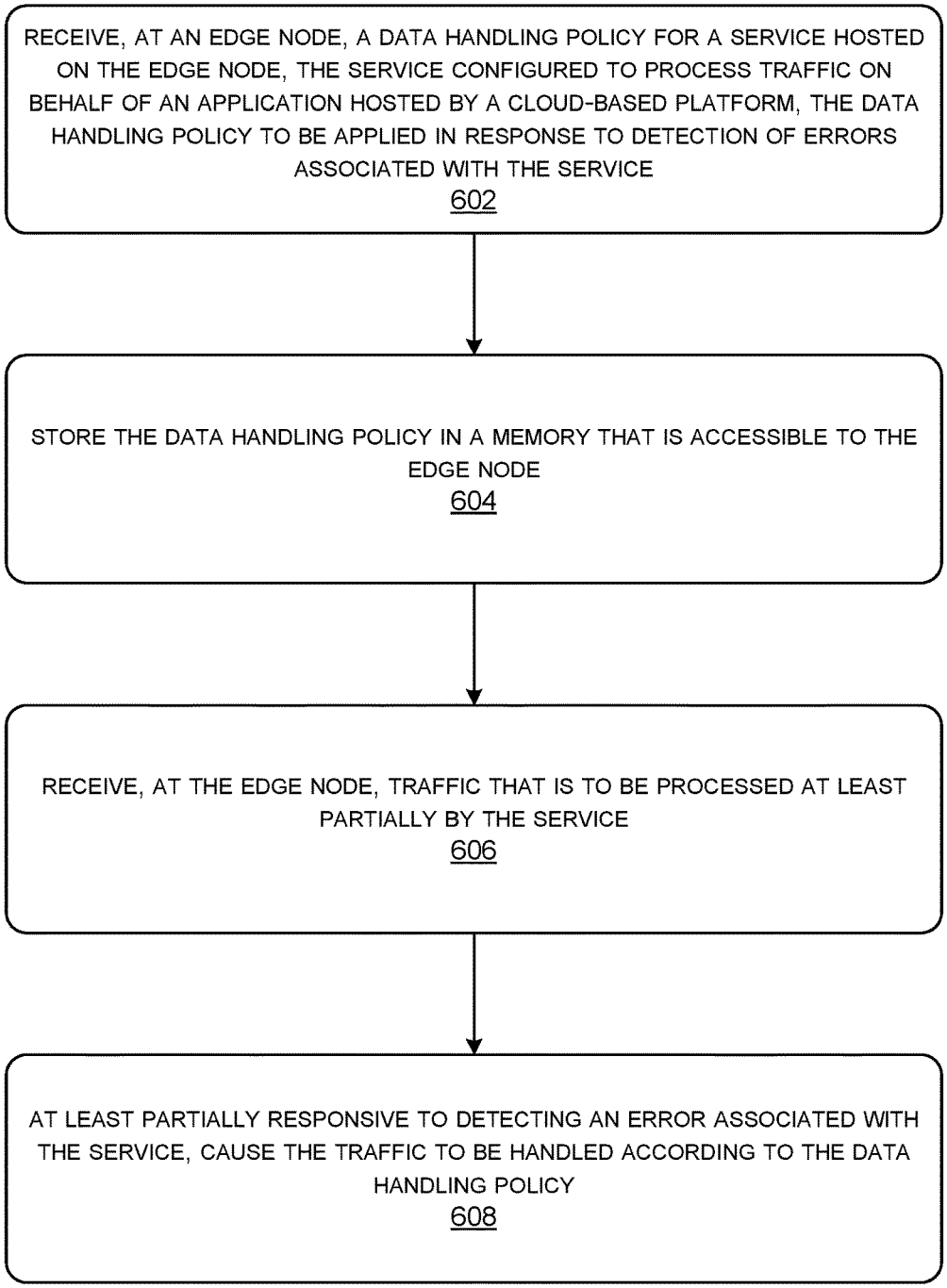
FIG. 6 is a flow diagram illustrating an example method for policy-based failure handling that leverages the sensitivity and criticality of the data that is received for processing by different edge services.

FIG. 6 is a flow diagram illustrating an example method 600 for policy-based failure handling that leverages the sensitivity and criticality of the data that is received for processing by different edge services. The logical operations described herein with respect to FIG. 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 600 begins at operation 602, which includes receiving, at an edge node of a network, a data handling policy for a service hosted on the edge node, the service configured to process traffic on behalf of an application hosted by a cloud-based platform, the data handling policy to be applied in response to detection of errors associated with the service. For instance, the edge node 106(1) may receive the data handling policy 122 from a connected client 120 that is using one or more of the edge services 108. Additionally, the service 108 may be configured to process traffic on behalf of an application 110 hosted by the cloud-based platform 102.

At operation 604, the method 600 includes storing the data handling policy in a memory that is accessible to the edge node. For instance, the data handling policy 122 may be stored in a memory of the edge node 106(1), in a data store, a key-value database, or the like. In at least one example, the data handling policy 122 is stored by the remedial service 220 that is running in the user space 204 of the edge node 106(1).

At operation 606, the method 600 includes receiving, at the edge node, traffic that is to be processed at least partially by the service. For instance, the edge node 106(1) may receive traffic 304 that is to be processed at least partially by the service 108. In some examples, the service may be configured to process the traffic at the edge node before the traffic is forwarded to the cloud-based platform.

At operation 608, at least partially responsive to detecting an error associated with the service, the method 600 includes causing the traffic to be handled according to the data handling policy. For instance, the eBPF program 206 or the remedial service 220 may cause the traffic to be handled according to the data handling policy 122. In some examples, an eBPF program running on the edge node may detect the error and update respective state entries in eBPF Maps. Additionally, a remedial service in the user space of the edge node may monitor the eBPF Map and, based on detecting a state change in the eBPF Map, the remedial service may trigger the subsequent operation negotiated in the data handling policy. In some examples, the data handling policy may specify that the edge node, in response to detecting an error associated with the service, is to drop the traffic, store the traffic until the error is resolved, send the traffic to a companion edge node for processing, send the traffic unprocessed to the cloud-based platform, and/or the like.

Figure 7:
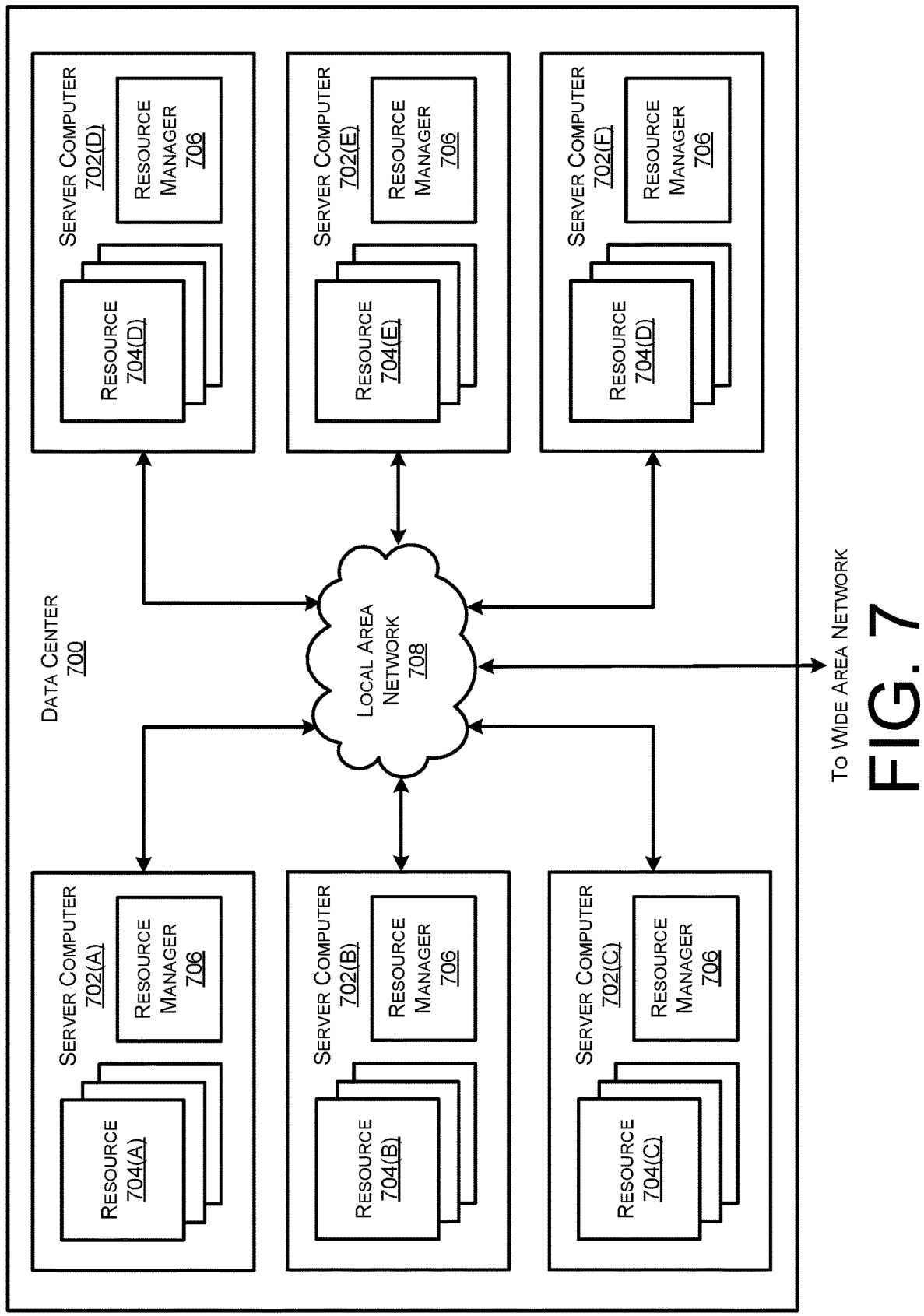
FIG. 7 is a computing system diagram illustrating an example configuration of a data center that can be utilized to implement aspects of the technologies disclosed herein.

FIG. 7 is a computing system diagram illustrating an example configuration of a data center 700 that can be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, any type of networked device or node described herein. Although described as servers, the server computers 702 may comprise any type of networked device, such as servers, switches, routers, hubs, bridges, gateways, modems, repeaters, access points, etc.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, security, packet inspection, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate local area network (LAN) 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 may each execute one or more application containers and/or virtual machines to perform techniques described herein. In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
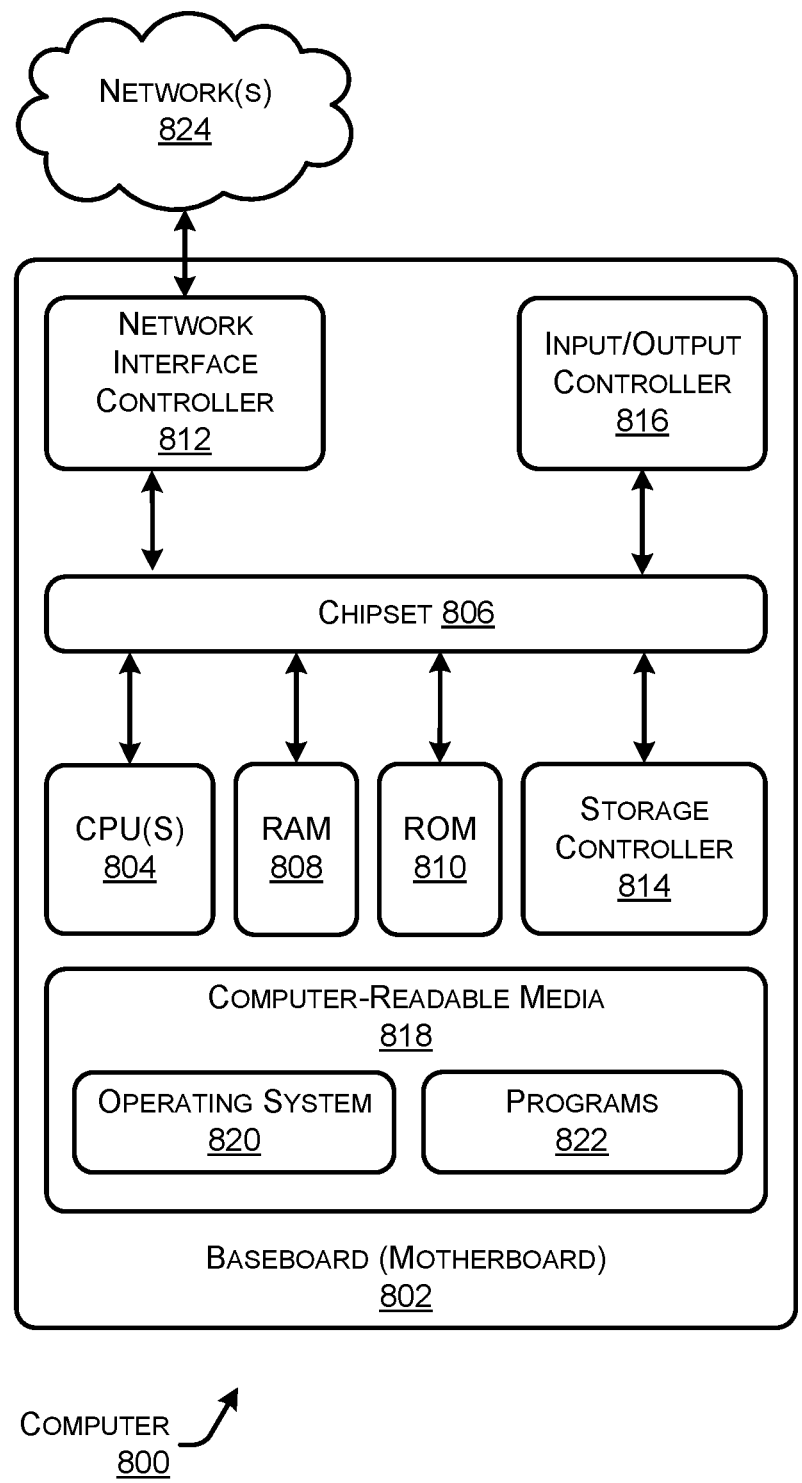
FIG. 8 is a computer architecture diagram showing an illustrative computer hardware architecture for implementing a computing device that can be utilized to implement aspects of the various technologies presented herein.

FIG. 8 is a computer architecture diagram showing an illustrative computer hardware architecture for implementing a computing device that can be utilized to implement aspects of the various technologies presented herein. The computer architecture shown in FIG. 8 illustrates a conventional server computer, network node, router, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 106. The chipset 806 can include functionality for providing network connectivity through a NIC 812, such as a gigabit Ethernet adapter. The NIC 812 is capable of connecting the computer 800 to other computing devices over the network 824 and/or network 102. It should be appreciated that multiple NICs 812 can be present in the computer 800, connecting the computer to other types of networks and remote computer systems. In some examples, the NIC 812 may be configured to perform at least some of the techniques described herein.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the architecture 100 and or any components included therein, may be supported by one or more devices similar to computer 800. Stated otherwise, some or all of the operations performed by the architecture 100, and or any components included therein, may be performed by one or more computer devices 800 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes and functionality described above with regard to FIGS. 1-7, and herein. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

The computer 800 may include one or more hardware processors 804 (processors) configured to execute one or more stored instructions. The processor(s) 804 may comprise one or more cores. Further, the computer 800 may include one or more network interfaces configured to provide communications between the computer 800 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for policy-based failure handling that leverages the sensitivity and criticality of the data that is received for processing by different edge services. For instance, the programs 822 may be eBPF programs to detect errors associated with edge services, a FaaS that may be invoked to perform edge service processing, cloud-based applications hosted on the cloud, and the like.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving, at an edge node of a network, a data handling policy that is to be applied to traffic in response to detecting errors associated with a service that is hosted on the edge node, the service configured to process the traffic at the edge node on behalf of an application hosted by a cloud-based platform;
   storing the data handling policy in a memory that is accessible to the edge node;
   receiving, at the edge node, the traffic that is to be processed at least partially by the service;
   detecting an error associated with the service by an extended Berkeley Packet Filter (eBPF) program executing on the edge node, the eBPF program being configured to analyze return traffic from the service and update an eBPF map to indicate a state associated with the service; and
   at least partially responsive to detecting the error associated with the service, causing the traffic to be handled according to the data handling policy.

2. The method of claim 1, wherein the data handling policy comprises one or more of dropping the traffic, storing the traffic until the error is resolved, sending the traffic to a companion edge node for processing, or sending the traffic unprocessed to the cloud-based platform.

3. The method of claim 1, wherein causing the traffic to be handled according to the data handling policy is at least partially responsive to the state associated with the service.

4. The method of claim 1, wherein causing the traffic to be handled according to the data handling policy is at least partially responsive to detecting, by a monitoring application executing on the edge node, a state change associated with the extended Berkeley Packet Filter (eBPF) map, the state change indicative of the error associated with the service.

5. The method of claim 1, wherein the data handling policy is to store the traffic until the error is resolved, and wherein the traffic is stored in a first memory of the edge node or a second memory of a device that sent the traffic.

6. The method of claim 1, wherein the data handling policy is to send the traffic to a companion edge node hosting the service for processing, the method further comprising:
   receiving, at the edge node and from the cloud-based platform, an indication that the traffic is to be sent to the companion edge node at least partially responsive to detecting the error;
   based at least in part on the indication, establishing a communication connection between the edge node and the companion edge node; and
   at least partially responsive to detecting the error, sending the traffic to the companion edge node via the communication connection.

7. The method of claim 1, wherein the data handling policy is to send the traffic unprocessed to the cloud-based platform, and wherein causing the traffic to be handled according to the data handling policy comprises:
   appending metadata to the traffic, the metadata including at least an identity of the service that was to process the traffic; and
   forwarding the traffic including the metadata to the cloud-based platform.

8. An edge node of a network, the edge node comprising:
one or more processors; and
one or more non-transitory computer-readable media storing instructions that, when executed by the one or more processors, cause the edge node to perform operations comprising:
receiving a data handling policy that is to be applied to traffic in response to detecting errors associated with a service that is hosted on the edge node, the service configured to process the traffic at the edge node on behalf of an application hosted by a cloud-based platform;
storing the data handling policy in a memory that is accessible to the edge node;
receiving the traffic that is to be processed at least partially by the service;
detecting an error associated with the service by an extended Berkeley Packet Filter (eBPF) program executing on the edge node, the eBPF program being configured to analyze return traffic from the service and update an eBPF map to indicate a state associated with the service; and
at least partially responsive to detecting the error associated with the service, causing the traffic to be handled according to the data handling policy.

9. The edge node of claim 8, wherein the data handling policy comprises one or more of dropping the traffic, storing the traffic until the error is resolved, sending the traffic to a companion edge node for processing, or sending the traffic unprocessed to the cloud-based platform.

10. The edge node of claim 9, wherein causing the traffic to be handled according to the data handling policy is at least partially responsive to the state associated with the service.

11. The edge node of claim 8, wherein causing the traffic to be handled according to the data handling policy is at least partially responsive to detecting, by a monitoring application executing on the edge node, a state change associated with the extended Berkeley Packet Filter (eBPF) map, the state change indicative of the error associated with the service.

12. The edge node of claim 8, wherein the data handling policy is to store the traffic until the error is resolved, and wherein the traffic is stored in a first memory of the edge node or a second memory of a device that sent the traffic.

13. The edge node of claim 8, wherein the data handling policy is to send the traffic to a companion edge node hosting the service for processing, the operations further comprising:
receiving, from the cloud-based platform, an indication that the traffic is to be sent to the companion edge node at least partially responsive to detecting the error;
based at least in part on the indication, establishing a communication connection with the companion edge node; and
at least partially responsive to detecting the error, sending the traffic to the companion edge node via the communication connection.

14. The edge node of claim 8, wherein the data handling policy is to send the traffic unprocessed to the cloud-based platform, and wherein causing the traffic to be handled according to the data handling policy comprises:
appending metadata to the traffic, the metadata including at least an identity of the service that was to process the traffic; and
forwarding the traffic including the metadata to the cloud-based platform.

15. A non-transitory computer-readable medium storing instructions that, when executed by one or more processors, cause the one or more processors to perform operations comprising:
receiving, at an edge node of a network, a data handling policy that is to be applied to traffic in response to detecting errors associated with a service that is hosted on the edge node, the service configured to process the traffic at the edge node on behalf of an application hosted by a cloud-based platform;
storing the data handling policy in a memory that is accessible to the edge node;
receiving, at the edge node, traffic that is to be processed at least partially by the service;
detecting an error associated with the service by an extended Berkeley Packet Filter (eBPF) program executing on the edge node, the eBPF program being configured to analyze return traffic from the service and update an eBPF map to indicate a state associated with the service; and
at least partially responsive to detecting the error associated with the service, causing the traffic to be handled according to the data handling policy.

16. The non-transitory computer-readable media of claim 15, wherein the data handling policy comprises one or more of dropping the traffic, storing the traffic until the error is resolved, sending the traffic to a companion edge node for processing, or sending the traffic unprocessed to the cloud-based platform.

17. The non-transitory computer-readable media of claim 15, wherein causing the traffic to be handled according to the data handling policy is at least partially responsive to the state associated with the service.

18. The non-transitory computer-readable media of claim 15, wherein causing the traffic to be handled according to the data handling policy is at least partially responsive to detecting, by a monitoring application executing on the edge node, a state change associated with the extended Berkeley Packet Filter (eBPF) map, the state change indicative of the error associated with the service.

19. The non-transitory computer-readable media of claim 15, wherein the data handling policy is to store the traffic until the error is resolved, and wherein the traffic is stored in a first memory of the edge node or a second memory of a device that sent the traffic.

20. The non-transitory computer-readable media of claim 15, wherein the data handling policy is to send the traffic unprocessed to the cloud-based platform, and wherein causing the traffic to be handled according to the data handling policy comprises:
appending metadata to the traffic, the metadata including at least an identity of the service that was to process the traffic; and
forwarding the traffic including the metadata to the cloud-based platform.

* * * * *